United States Patent [19]
Hunt

[11] Patent Number: 6,068,797
[45] Date of Patent: May 30, 2000

[54] METHOD OF PREPARING A SHAPED ARTICLE HAVING A PHOTOCHROMIC COATING THEREON

[75] Inventor: Robin L. Hunt, Pittsburgh, Pa.

[73] Assignee: PPG Industries Ohio, Inc., Cleveland, Ohio

[21] Appl. No.: 09/209,717

[22] Filed: Dec. 11, 1998

[51] Int. Cl.[7] .................................................. B29D 11/00
[52] U.S. Cl. ........................ 264/1.7; 264/255; 525/934
[58] Field of Search .............................. 264/1.1, 1.7, 1.8, 264/255, 245, 246; 525/934; 427/162, 164

[56] References Cited

U.S. PATENT DOCUMENTS

| | | |
|---|---|---|
| 2,370,567 | 2/1945 | Muskat et al. . |
| 2,403,113 | 7/1946 | Muskat et al. . |
| 3,216,877 | 11/1965 | Mohr .................................... 156/230 |
| 3,361,706 | 2/1968 | Smith et al. . |
| 3,562,172 | 2/1971 | Ono et al. . |
| 3,567,605 | 3/1971 | Becker . |
| 3,578,602 | 5/1971 | Ono et al. . |
| 4,205,028 | 5/1980 | Brueggemann et al. . |
| 4,215,010 | 7/1980 | Hovey et al. . |
| 4,228,113 | 10/1980 | van Gasse . |
| 4,287,310 | 9/1981 | van Gasse ................................. 525/44 |
| 4,315,884 | 2/1982 | Van Gasse ............................. 264/255 |
| 4,316,869 | 2/1982 | Van Gasse ............................. 264/255 |
| 4,342,668 | 8/1982 | Hovey et al. ........................... 252/586 |
| 4,349,601 | 9/1982 | Brueggemann et al. ............... 428/323 |
| 4,367,170 | 1/1983 | Uhlmann et al. ....................... 252/586 |
| 4,499,235 | 2/1985 | Verwer et al. ............................ 525/38 |
| 4,556,605 | 12/1985 | Mogami et al. ......................... 428/331 |
| 4,637,698 | 1/1987 | Kwak et al. ............................. 351/163 |
| 4,800,123 | 1/1989 | Boeckeler ............................ 428/424.2 |
| 4,801,680 | 1/1989 | Geary et al. ............................. 528/272 |
| 4,816,584 | 3/1989 | Kwak et al. ............................... 344/71 |
| 4,818,096 | 4/1989 | Heller et al. ............................ 351/163 |
| 4,826,977 | 5/1989 | Heller et al. ............................... 544/70 |
| 4,873,274 | 10/1989 | Cummings et al. ..................... 523/500 |
| 4,880,667 | 11/1989 | Welch ..................................... 427/160 |
| 4,889,890 | 12/1989 | Kerr et al. ............................... 525/113 |
| 4,931,219 | 6/1990 | Kwiatkowski et al. ................ 252/586 |

(List continued on next page.)

FOREIGN PATENT DOCUMENTS

| | | |
|---|---|---|
| 4-97241 | 3/1992 | Japan . |
| 62-195383 | 9/1993 | Japan . |
| 10-168439 | 6/1998 | Japan . |

*Primary Examiner*—Mathieu D. Vargot
*Attorney, Agent, or Firm*—James R. Franks; Irwin M. Stein

[57] ABSTRACT

A method of preparing a shaped article having a photochromic coating thereon, and curable photochromic powder coating compositions are described. The method includes: applying at least one curable powder coating composition to at least a portion of the interior of a mold, e.g., a lens mold, wherein at least one of the applied powder coating compositions includes a photochromic amount of photochromic material; curing at least partially the applied photochromic powder coating; charging a polymerizable organic casting composition into the mold; polymerizing the casting composition; and removing a shaped article having a photochromic coating on at least a portion of its surface from the mold.

15 Claims, 2 Drawing Sheets

U.S. PATENT DOCUMENTS

| | | | |
|---|---|---|---|
| 4,931,220 | 6/1990 | Haynes et al. | 252/586 |
| 4,937,288 | 6/1990 | Pettit, Jr. et al. | 525/176 |
| 4,980,113 | 12/1990 | Cummings et al. | 264/255 |
| 4,997,900 | 3/1991 | Brinkman | 528/45 |
| 5,066,818 | 11/1991 | Gemert et al. | 549/389 |
| 5,098,955 | 3/1992 | Pettit, Jr. | 525/194 |
| 5,130,353 | 7/1992 | Fischer et al. | 524/43 |
| 5,202,382 | 4/1993 | Pettit, Jr. | 525/108 |
| 5,214,101 | 5/1993 | Pettit, Jr. et al. | 525/176 |
| 5,234,799 | 8/1993 | Nagae et al. | 430/345 |
| 5,238,931 | 8/1993 | Yoshikawa et al. | 514/184 |
| 5,274,132 | 12/1993 | VanGemert | 549/389 |
| 5,304,332 | 4/1994 | Richart | 264/255 |
| 5,384,077 | 1/1995 | Knowles | 252/586 |
| 5,391,327 | 2/1995 | Ligas et al. | 252/586 |
| 5,405,557 | 4/1995 | Kingsbury | 264/1.7 |
| 5,405,958 | 4/1995 | VanGemert | 544/71 |
| 5,407,707 | 4/1995 | Simeone et al. | 427/410 |
| 5,429,774 | 7/1995 | Kumar | 252/586 |
| 5,439,896 | 8/1995 | Ito et al. | 525/107 |
| 5,466,398 | 11/1995 | Van Gemert et al. | 252/586 |
| 5,480,726 | 1/1996 | Richart | 428/482 |
| 5,508,337 | 4/1996 | Wamprecht et al. | 524/507 |
| 5,510,444 | 4/1996 | Halpaap et al. | 528/45 |
| 5,516,551 | 5/1996 | Anderson et al. | 427/195 |
| 5,523,030 | 6/1996 | Kingsbury | 264/1.7 |
| 5,531,940 | 7/1996 | Gupta et al. | 264/1.7 |
| 5,554,692 | 9/1996 | Ross | 525/124 |
| 5,594,088 | 1/1997 | Nagata et al. | 528/77 |
| 5,621,064 | 4/1997 | Laas et al. | 528/60 |
| 5,624,735 | 4/1997 | Anderson et al. | 428/192 |
| 5,663,240 | 9/1997 | Simeone et al. | 525/327.3 |
| 5,693,738 | 12/1997 | Okazaki et al. | 528/51 |
| 5,710,214 | 1/1998 | Chou et al. | 525/124 |
| 5,733,483 | 3/1998 | Soane et al. | 264/1.7 |
| 5,759,729 | 6/1998 | Martin et al. | 430/106 |
| 5,777,061 | 7/1998 | Yonek et al. | 528/45 |
| 5,811,503 | 9/1998 | Herold et al. | 526/323.2 |
| 5,882,556 | 3/1999 | Perrott et al. | 264/1.7 |

METHOD OF PREPARING A SHAPED ARTICLE HAVING A PHOTOCHROMIC COATING THEREON

DESCRIPTION OF THE INVENTION

The present invention relates to a method of preparing a shaped article having a photochromic coating thereon. More particularly, the present invention relates to a method of preparing a shaped article having a photochromic coating on at least one surface of the article, wherein one or more curable powder coating compositions, at least one of which comprises photochromic material, are applied to at least a portion of the interior of a mold in which the shaped article, e.g., a lens, is prepared, a casting composition is charged to the mold, the casting composition cured, and the coated article is removed from the mold. The present invention also relates to a curable photochromic powder coating composition and to a shaped article, e.g., a lens, having a photochromic coating thereon.

A number of organic polymeric materials, e.g., plastics, have been developed as alternatives and replacements for glass in applications such as, optical lenses, fiber optics, windows, and automotive, nautical and aviation transparencies. As used herein, the term 'glass' is meant to refer to silica-based inorganic glass. These polymeric materials can provide advantages relative to glass, including, shatter resistance, lighter weight for a given application, ease of molding and ease of dying. Representative examples of such organic polymeric materials include, homopolymers and copolymers of poly(methyl methacrylate), thermoplastic polycarbonate and poly(diethylene glycol bis (allylcarbonate)).

Recently, photochromic plastic materials have been the subject of considerable attention. In particular, photochromic ophthalmic plastic lenses have been investigated in part due to the weight advantage that they can offer relative to ophthalmic lenses made of glass. In addition, photochromic transparencies for vehicles, such as automobiles and airplanes, have been of interest because of the potential safety features that such transparencies offer.

Plastic articles having photochromic properties are often prepared through a process of imbibition. Imbibition typically involves applying a coating containing a photochromic material to a surface of a molded article, heating the resultant coated article to imbibe the photochromic material into the article, and then removing any residual coating from the surface of the article. In some cases the untreated plastic article is undercured in order to allow imbibition of the photochromic material into the surface of the plastic article. Following imbibition, a post cure step may be required to fully cure the photochromic article. Such a multi-step process may require extra labor, time and equipment. In addition, imbibition methods can result in uneven take-up or impregnation of the photochromic material into the surface of the article. Further, only a limited amount of photochromic material can be impregnated into the surface of the article by means of imbibition, resulting in photochromic articles that may contain less than a desired level of photochromic material.

Photochromic plastic articles may also be prepared by blending a photochromic amount of a photochromic material and a polymerizable organic casting composition, filling a mold with this blend, and polymerizing the blend within the mold. A drawback of this method can be the possible partial or permanent destruction of the photochromic property of the photochromic material during the polymerization process by, for example, reactants within the polymerizable organic composition, e.g., free radical initiators. In addition, in certain cases the three dimensional network formed as a result of the polymerization process can itself physically hinder the reversible conversion of the photochromic material between its non-colored and colored states.

Photochromic plastic articles can be prepared further by applying a coating containing a photochromic material to a surface of a preformed article. Photochromic coatings applied directly to the surface of a preformed article, such as an ophthalmic lens, are prone to surface defects resulting from, for example, inadequate leveling of the applied coating and dirt or dust contamination. Defects in the surface of the applied photochromic coating can result in visually observable optical distortions, which are particularly undesirable in such applications as, for example, ophthalmic lenses and automotive vehicle transparencies.

U.S. Pat. No. 4,800,123 describes a radiation curable scratch resistant coating for peroxide curable urethane elastomers. The scratch resistant coating of the '123 patent is applied as a liquid to at least one mold surface and the mold is closed for receiving the urethane elastomer. The method of the '123 patent is described as being suitable for coating plastic optically clear lenses.

U.S. Pat. No. 5,759,729 describes dry toner compositions, which comprise particles comprising a mixture of a resin and a photochromic material. Examples of typical toner resins described in the '729 patent include polyesters, polyamides, epoxies, polyurethanes and vinyl resins.

Japanese Patent Publication No. JP 04097241 describes an optical memory element prepared by applying a powder admixture of a resin powder, e.g., poly(methyl methacrylate), and photochromic powder material to a resin substrate, e.g., polycarbonate, and melting the applied powder admixture. Curable powder mixtures are not described.

Japanese Patent Publication No. JP 10168439 describes polymer fine powders containing light-resistant photochromic dye, which powders can be suitably used as dyes and pigments in paints or inks. Curable polymer fine powders containing light-resistant photochromic dye are not described.

U.S. Pat. No. 4,228,113 describes the preparation of three dimensional shaped objects in a mold in which the mold wall is provided at elevated temperature with a layer of powdery curable resin. The '113 patent further describes the application of two or more layers of powdery curable resin to the wall of the mold, for example, a transparent layer and a pigmented layer.

In accordance with an embodiment of the present invention, there is provided a method of preparing a shaped article having a photochromic coating thereon comprising:

(a) applying at least one curable powder coating composition to at least a portion of the interior of a mold having defined interior surfaces, wherein at least one of said applied powder coating compositions comprises a photochromic amount of photochromic material;

(b) curing at least partially said applied powder coating composition;

(c) charging a polymerizable organic casting composition into said mold;

(d) polymerizing said polymerizable organic casting composition; and (e) removing from said mold a shaped article having a photochromic coating on at least a portion of a surface of said shaped article.

In accordance with a further embodiment of the present invention, there is provided a method of preparing a shaped article having a photochromic coating thereon as described above wherein said method further comprises applying at least one additional curable powder coating composition to at least a portion of the interior of said mold other than that portion to which said curable powder coating compositions of step (a) are applied, said additional curable powder coating composition being selected from curable powder coating compositions comprising a photochromic amount of a photochromic material, curable optically clear powder coating compositions that are substantially free of photochromic material, and mixtures of said powder coating compositions.

In accordance with yet a further embodiment of the present invention, there is provided a curable photochromic powder coating composition comprising: a first reactant having functional groups; a second reactant having functional groups that are reactive with the functional groups of the first reactant; and a photochromic amount of photochromic material.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the operating examples, or where otherwise indicated, all numbers expressing quantities of ingredients, reaction conditions, and so forth used in the specification and claims are to be understood as modified in all instances by the term "about."

BRIEF DESCRIPTION OF THE DRAWINGS

In FIGS. 1–4, like reference numerals represent the same structural parts. FIGS. 1–4 are not drawn to scale.

DETAILED DESCRIPTION OF THE INVENTION

Figure 1:
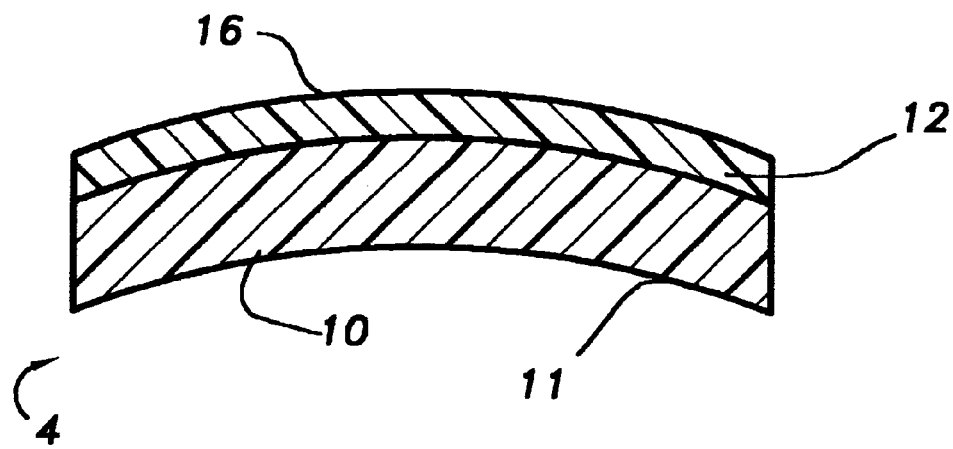
FIG. 1 is a representation of a cross-sectional view of a lens having a photochromic coating thereon prepared according to the method of the present invention.

Molds that are used in the method of the present invention may be fabricated from any suitable material or combination of materials, for example, glass, plastic or steel. Typically, molds have separate sections, e.g., halves, that when assembled form a cavity defined by the interior surfaces of the separate sections of the mold. The interior surfaces of the mold also serve to define the exterior surfaces of the shaped article that is cast therein. Molds having very smooth interior surfaces can be used to cast articles having very smooth exterior surfaces, e.g., ophthalmic lenses.

In accordance with the method of the present invention, one or more curable powder coating compositions, at least one of which comprises a photochromic amount of photochromic material, are applied to at least a portion of the interior of the mold. For example, when the shaped article is an ophthalmic lens, the curable powder coating composition(s) can be applied to all or a portion of the interior surfaces of the mold, e.g., to those surfaces of the mold that define the concave and convex surfaces of the cast lens, as single or multi-layered coatings. The powder coating composition(s) may be applied to a portion of an interior surface or section of the mold in the form of, for example, a film build gradient and/or pattern. More often, when the shaped article is an ophthalmic lens, the powder coating composition(s) is typically applied to at least a portion of, and more typically to the whole of the interior surface of the mold that defines the convex surface of the cast lens.

As used herein by "the interior surfaces of a mold" and like phrases, are meant to be inclusive also of interior mold surfaces to which treatments, laminates and/or coatings have been previously applied. For example, the scope of the method of the present invention is inclusive of the application of powder coating compositions over mold release agents and/or hard-coatings and/or anti-reflective coatings that have been previously applied to the interior surfaces of the mold.

Curable powder coatings are particulate compositions that are solid and free flowing at ambient room temperature. The curable powder coating compositions may be applied to the interior surfaces of the mold by any appropriate means that are known to those of ordinary skill in the art. Generally, the powder coating composition is applied by a spray application.

The photochromic coatings of shaped articles prepared according to the method of the present invention are typically as smooth as the interior surfaces of the mold to which they are applied, and are substantially free of surface defects due to, for example, inadequate leveling of the coating and dirt or dust. When the mold is an ophthalmic lens mold, the photochromic coating of the article formed therein, i.e. an ophthalmic lens, has a substantially optically smooth surface.

As used herein and in the claims, by "photochromic coating" and like terms is meant a single powder coating layer comprising a photochromic amount of photochromic material, or a plurality of powder coating layers, e.g., a multi-layered composite powder coating, at least one layer of which comprises a photochromic amount of photochromic material. In the method of the present invention, the curable powder coating composition(s) applied to at least a portion of the interior surfaces of the mold are transferred to the corresponding surfaces of the shaped article prepared in said mold.

The use of one or more curable powder coatings in the method of the present invention eliminates many of the problems associated with the use of solvent borne liquid in-mold applied coatings. For example, if the solvent is not thoroughly removed from the applied in-mold coating, defects in the coating can result from the entrapment of volatilized solvent during the casting process. Since powder coatings are substantially free of solvent, such defects are eliminated.

When the interior surfaces of the mold are electrically conductive, the curable powder coating composition is typically applied electrostatically. Electrostatic spray application generally involves drawing the curable powder coating composition from a fluidized bed and propelling it through a corona field. The particles of the powder composition become charged as they pass through the corona field and are attracted to and deposited upon the electrically conductive interior surfaces of the mold, which are grounded. As the charged particles begin to build up, the interior surfaces of the mold become insulated, thus limiting further particle deposition. This insulating phenomenon typically limits the film build of the deposited powder coating composition by this method to a maximum of 3 to 6 mils (75 to 150 microns).

Alternatively, when the interior surfaces of the mold are not electrically conductive, as is the case with glass molds, the surfaces are typically preheated prior to application of the powder composition. Powder coating compositions are typically applied without an electrostatic corona field when deposited onto non-conductive preheated surfaces. The preheated temperature of the interior surfaces of the mold is preferably equal to or greater than that of the melting point of the curable powder coating composition applied to the mold, but less than its cure temperature. In addition, the preheated mold temperature is less than that at which the interior mold surfaces will suffer deleterious defects, such as cracking or warping. With spray application over preheated surfaces, film builds of the curable powder coating composition in excess of 6 mils (150 microns) can be achieved, e.g., 10 to 20 mils (254 to 508 microns). Whether applied by means of electrostatic or preheated surface methods, the curable powder coating composition(s) of the present invention is typically applied at independent film builds of from 0.5 to 20 mils (12.7 to 508 microns), preferably from 1 to 10 mils (25.4 to 254 microns), and more preferably from 1.5 to 3 mils (38.1 to 76.2 microns).

The applied curable powder coating composition(s) is cured at least partially prior to charging a polymerizable organic casting composition into the mold. As used herein and in the claims, by "curing at least partially" and like terms is meant that the powder coating composition(s) is cured at least to a degree such that it forms an adherent (to the interior mold surface) coating of sufficient integrity that it is not solubilized and removed from the interior surfaces of the mold by contact with the polymerizable organic casting composition that is charged into the mold cavity (prior to polymerizing the casting composition). The powder coating composition may be cured by any suitable means including, for example, the application of heat and/or light energy, including ultraviolet and visible light. Generally, the curable powder coating composition is cured through the application of heat, in which case it is a thermocurable or thermosetting powder coating composition.

The time and temperature required to cure at least partially the applied powder coating composition depends in part on the chemistry of the particular powder coating(s) used, as is known to those of ordinary skill in the art. Typically, the applied powder coating composition is cured at a temperature in the range of 121° C. to 191° C. over period of from 10 to 90 minutes.

A polymerizable organic casting composition is charged into the coated mold according to known methods. When the casting composition is in the form of a liquid, it may be charged into the mold by means of, for example, injection or pouring. When the casting composition is in the form of a partially cured and formable gel it may be laid or placed into one portion or half of the mold prior to closing the mold.

In an embodiment of the present invention, the casting composition is a preformed shaped article, e.g., a preformed ophthalmic lens, that is placed into the powder coated mold prior to closing the mold. The preformed shaped article is typically (although not always) undercured and subsequently fully cured or polymerized after being placed in the powder coated mold.

The casting composition is typically polymerized by the application of heat and/or light, e.g., ultraviolet light, energy. While not meaning to be bound by any theory, it is believed that the method of the present invention results in the formation of an intimate and uniform bond of a physical and/or chemical nature between the matrix of the polymerized casting composition and that of the applied powder coating composition. The bond between the applied powder coating composition and the matrix of the casting composition is preferably greater than any bonding interactions that may exist between the cured powder coating composition and the interior surfaces of the mold. The shaped article having a photochromic coating thereon is removed from the mold by known methods which include, for example, removing the clamping pressure and pulling the mold apart or shattering the mold.

In an embodiment of the present invention, at least one additional powder coating composition is applied to at least a portion of the interior of the mold to which the previously applied powder coating composition or compositions have not been applied. The additionally applied powder coating composition(s) may or may not comprise a photochromic amount of a photochromic material. For example, at least one curable powder composition (at least one of which comprises a photochromic amount of photochromic material) may be applied to the concave interior surface of a mold used to prepare ophthalmic lenses, and at least one additional powder coating composition (as described previously herein) may be applied to the convex interior surface of the mold. A shaped article prepared in such an interior powder coated ophthalmic lens mold according to the method of the present invention may have, for example: a single or multi-layered photochromic coating on its convex surface and a single or multi-layered optically clear coating on its concave surface; or a single or multi-layered photochromic coating on its convex surface and a single or multi-layered photochromic coating on its concave surface (the photochromic coatings on the convex and concave surfaces being the same or different). As used herein and in the claims, by "optically clear curable powder coating composition that is substantially free of photochromic material" and similar phrases is meant a powder coating composition that may contain nonphotochromic dyes and/or colorants.

In another embodiment of the present invention, two curable powder coating compositions, at least one of which comprises a photochromic amount of photochromic material, are applied sequentially to at least a portion of the interior of the mold. More particularly, a curable powder coating composition comprising a photochromic amount of photochromic material is applied to at least a portion of the interior of the mold, followed by the application of a curable optically clear powder coating composition that is substantially free of photochromic material over at least a portion of the applied curable photochromic powder coating composition. In a further embodiment of the present invention, the optically clear powder coating composition that is substantially free of photochromic material is applied first followed by the application of the photochromic powder coating composition.

In a further embodiment of present invention, three curable powder coating compositions, at least one of which comprises a photochromic amount of photochromic material, are applied sequentially to at least a portion of the interior of the mold. For example, a first curable optically clear powder coating composition that is substantially free of photochromic material is applied to at least a portion of the interior of the mold; a curable powder coating composition comprising a photochromic amount of photochromic material is applied over at least a portion of the applied first optically clear powder coating composition; and a second curable optically clear powder coating composition that is substantially free of photochromic material is applied over at least a portion of the applied curable photochromic powder coating composition. The first and second curable optically clear powder coating compositions may be the same or different.

In accordance with the method of the present invention, when more than one curable powder coating composition is applied to at least a portion of the interior of the mold, each of the applied powder coating compositions may comprise a photochromic amount of photochromic material. The photochromic materials may be the same or different and may be present at the same or different concentrations in each of the applied curable powder coating compositions. For example, when two different photochromic materials are not compatible with the chemistry of a single curable powder coating composition, they may be incorporated separately into powder coating compositions having chemistries with which they are compatible. A shaped article according to the present invention having the benefit of two different photochromic materials can be obtained by applying two curable photochromic powder coating compositions each of which compositions comprises a different photochromic material.

In yet a further embodiment of the present invention, a first curable powder coating composition comprising a photochromic amount of photochromic material is applied to at least a portion of the interior of the mold, and a second curable powder coating composition comprising a photochromic amount of photochromic material is superposed, e.g., superimposed, on the applied first curable powder coating composition. The photochromic material of the second powder coating composition is different than the photochromic material of the first powder coating composition. Optionally, a curable optically clear powder coating composition that is substantially free of photochromic material is superposed, e.g., superimposed, on the second curable powder coating composition.

The method of the present invention includes also the use of mold release agents. When used, mold release agents are typically applied to at least a portion of the interior surfaces of the mold prior to the application of the curable powder coating composition(s). Classes of mold release agents that are useful in the present invention include, for example, silicones and aliphatic phosphate esters. An example of a useful mold release agent is ZELEC® UN Lubricant, which is described as a mixture of $C_8$–$C_{16}$ alkyl esters of phosphoric acid, and which is available from Du Pont Chemicals.

Curable powder coating compositions typically comprise a first reactant having functional groups, e.g., an epoxide functional polymer reactant, and a second reactant that is a crosslinking agent having functional groups that are reactive towards and that can form covalent bonds with the functional groups of the first reactant. The first and second reactants of the curable powder coating composition may each independently comprise one or more functional species, and are each present in amounts sufficient to provide cured coatings having a desirable combination of physical properties, e.g., smoothness, optical clarity, solvent resistance and hardness.

Examples of curable powder coating compositions useful in the method of the present invention include, but are not limited to, powder coating compositions comprising epoxide functional polymer and epoxide reactive crosslinking agent, for example as described in U.S. Pat. Nos. 5,407,707, 5,663,240 and 5,710,214; powder coating compositions comprising carboxylic acid functional polymer and betahydroxyalkylamide functional crosslinking agent, for example as described in U.S. Pat. Nos. 4,801,680, 4,889,890, 4,937,288, 5,098,955, 5,202,382 and 5,214,101; and powder coating compositions comprising hydroxy functional polymer and capped isocyanate functional crosslinking agent, for example as described U.S. Pat. Nos. 4,997,900, 5,439,896, 5,508,337, 5,510,444, 5,554,692, 5,621,064 and 5,777,061. The disclosures of these cited United States patents are incorporated herein by reference in their entirety. As used herein and in the claims, by "polymer," e.g., epoxide functional polymer, is meant oligomeric and/or polymeric species, and homopolymers and/or copolymers.

Polymers comprising the majority of the binder resins in curable powder coating compositions are solid at room temperature, typically having differential scanning calorimetry (DSC) derived glass transition midpoint values of from 30° C. to 80° C., e.g., from 35° C. to 50° C. These polymers also typically have number average molecular weights (Mn) of from 500 to 15,000. As used herein, and unless otherwise noted, polymer molecular weights, such as Mn, are determined by gel permeation chromatography (GPC) using polystyrene standards. Accordingly, polymer molecular weights as presented herein do not represent absolute values, but rather averaged values relative to a set of polystyrene standards.

Classes of epoxide functional polymers useful in the curable powder coating compositions of the method of the present invention include, but are not limited to, epoxide functional vinyl polymers, e.g., epoxide functional (meth) acrylic polymers, epoxide functional polyethers, epoxide functional polyesters and combinations thereof. Epoxide functional vinyl polymers can be prepared by free radical polymerization methods that are known to those of ordinary skill in the art. Such known free radical polymerization methods typically make use of suitable initiators, which include organic peroxides and azo type compounds and chain transfer agents, such as alpha-methyl styrene dimer and tertiary dodecyl mercaptan.

Epoxide functional vinyl polymers are typically prepared by polymerizing one or more epoxide functional ethylenically unsaturated monomers, e.g., glycidyl methacrylate, with one or more ethylenically unsaturated monomers that are free of epoxide functionality, e.g., methyl (meth) acrylate, isobornyl (meth)acrylate, butyl (meth)acrylate and styrene. Examples of epoxide functional ethylenically unsaturated monomers that may be used in the preparation of epoxide functional vinyl polymers include, but are not limited to, glycidyl (meth)acrylate, 3,4-epoxycyclohexylmethyl (meth)acrylate, 2-(3,4-epoxycyclohexyl)ethyl (meth)acrylate and allyl glycidyl ether. As used herein, by "(meth)acrylate" and like terms is meant both methacrylates and acrylates. Examples of ethylenically unsaturated monomers that are free of epoxide functionality include those described in U.S. Pat. No. 5,407,707 at column 2, lines 17 through 56, which disclosure is incorporated herein by reference.

In a preferred embodiment of the present invention, the epoxide functional vinyl polymer is prepared from a majority of (meth)acrylate monomers and is referred to herein as an "epoxide functional (meth)acrylic polymer." The epoxide functional vinyl polymer typically has a number average molecular weight of from 500 to 5000, e.g., from 800 to 2500.

An epoxide functional (meth)acrylic polymer useful in curable powder coating compositions used in the method of the present invention may be prepared on a laboratory scale from the following list of ingredients.

| Epoxide Functional (Meth)Acrylic Polymer | |
|---|---|
| Ingredients | Parts By Weight |
| Charge 1 | |
| xylene | 688 |
| Charge 2 | |
| Glycidyl Methacrylate | 861 |
| Isobornyl Methacrylate | 861 |
| Methyl Methacrylate | 215 |
| Styrene | 215 |
| Methyl Styrene Dimer | 108 |
| Charge 3 | |
| Xylene | 103 |
| LUPERSOL 555-M60 initiator (a) | 226 |
| Charge 4 | |
| Xylene | 43 |
| Charge 5 | |
| Xylene | 16.5 |
| LUPERSOL 555-M60 initiator | 17.9 |
| Charge 6 | |
| Xylene | 43 |

(a) LUPERSOL 555-M60 initiator is described as t-amyl peroxyacetate (60% by weight in odorless mineral spirits), available from Elf-Atochem North America, Inc.

Charge 1 is heated to reflux temperature at atmospheric pressure under a nitrogen blanket in a 5 liter round bottom flask equipped with a rotary blade agitator, reflux condenser, thermometer and heating mantle coupled together in a feed-back loop through a temperature controller, nitrogen inlet port, and two addition ports. While under conditions of reflux, Charges 2 and 3 are simultaneously fed into the flask over a period of 3 hours. Upon completing the feeds of Charges 2 and 3, Charge 4 is divided into two equal parts and used to rinse any residual material remaining in the addition funnels of Charges 2 and 3 into the flask. Under reflux conditions Charge 5 is then fed into the flask over a period of 1 hour. The addition funnel of Charge 5 is then rinsed with Charge 6, followed by a one hour hold under reflux conditions. The contents of the flask are then vacuum stripped. While still molten, the stripped contents of the flask are transferred to a suitable shallow open container and allowed to cool to room temperature and harden. Solid epoxide functional acrylic polymers resulting from the synthesis as described typically have a solids content of 99.5% by weight, based on total weight (measured at 110° C. for one hour), a number average molecular weight of 800 and a weight average molecular weight of 3000 (as determined using gel permeation chromatography with polystyrene standards), and a glass transition temperature midpoint (Tg) of 50° C. (as determined by differential scanning calorimetry).

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has hydroxy functionality and the desired molecular weight.

Examples of multifunctional carboxylic acids useful in preparing hydroxy functional polyesters are known to the skilled artisan and include, for example, phthalic acid, tetrahydrophthalic acid, hexahydrophthalic acid, isophthalic acid and terephthalic acid. Examples of polyols useful in preparing hydroxy functional polyesters are known to those skilled in the art and include, for example, glycerin, trimethylolpropane, ethylene glycol and 1,4-dimethylolcyclohexane.

Epoxide reactive crosslinking agents that are used in thermosetting powder coating compositions comprising epoxide functional polymer may have functional groups selected from the group consisting of hydoxyl, thiol, primary amines, secondary amines, carboxyl and mixtures thereof. Useful epoxide reactive crosslinking agents having amine functionality include, for example, dicyandiamide and substituted dicyandiamides. Preferably, the epoxide reactive crosslinking agent has carboxylic acid groups. In one embodiment of the present invention, the epoxide reactive crosslinking agent has carboxylic acid functionality and is substantially crystalline. By "crystalline" is meant that the coreactant contains at least some crystalline domains, and correspondingly may contain some amorphous domains. While not necessary, it is preferred that the epoxide reactive crosslinking agent have a melt viscosity less than that of the epoxy functional polymer (at the same temperature). As used herein and in the claims, by "epoxide reactive crosslinking agent" is meant that the epoxide reactive crosslinking agent has at least two functional groups that are reactive with epoxide functionality.

Preferably, the epoxide reactive crosslinking agent is a carboxylic acid functional crosslinking agent, which typically contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebasic acid, maleic acid, citric acid, itaconic acid, aconitic acid and mixtures thereof.

Other suitable carboxylic acid functional crosslinking agents include those represented by the following general formula I,

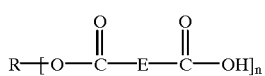

I

In general formula I, R is the residue of a polyol, E is a divalent linking group having from 1 to 10 carbon atoms, and n is an integer of from 2 to 10. Examples of polyols from which R of general formula I may be derived include, but are not limited to, ethylene glycol, di(ethylene glycol), trimethylolethane, trimethylolpropane, pentaerythritol, di-trimethylolpropane, di-pentaerythritol and mixtures thereof. Divalent linking groups from which E may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid-1,2-phenylene. The divalent linking group E is preferably aliphatic.

The crosslinking agent represented by general formula I is typically prepared from a polyol and a dibasic acid or cyclic anhydride. For example, trimethylol propane and hexahydro-4-methylphthalic anhydride are reacted together in a molar ratio of 1:3 respectively, to form a carboxylic acid functional crosslinking agent. This particular crosslinking agent can be described with reference to general formula I as follows, R is the residue of trimethylol propane, E is the divalent linking group 4-methyl-1,2-cyclohexylene, and n is 3. Carboxylic acid functional crosslinking agents described herein with reference to general formula I are meant to include also any unreacted starting materials and/or co-products, e.g., oligomeric species, resulting from their preparation and contained therein.

Curable powder coating compositions comprising epoxide functional polymer and epoxide reactive crosslinking agent usually also include one or more cure catalysts for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. Curing catalyst is typically present in the curable powder coating composition in an amount of less than 5 percent by weight, e.g., from 0.25 percent by weight to 2.0 percent by weight, based on total resin solids weight of the composition.

Curable powder coating compositions comprising epoxide functional polymer and epoxide reactive crosslinking agent typically have present therein epoxide functional polymer in an amount of from 60 percent to 95 percent by weight, based on total resin solids weight of the composition, e.g., from 70 percent to 85 percent by weight, based on total resin solids weight of the composition. The epoxide reactive crosslinking agent is typically present in the curable powder coating composition in an amount corresponding to the balance of these recited ranges, i.e., 5 to 40, particularly 15 to 30, percent by weight. The equivalent ratio of epoxide equivalents in the epoxide functional polymer to the equivalents of reactive functional groups in the crosslinking agent is typically from 0.5:1 to 2:1, e.g., from 0.8:1 to 1.5:1. Curable powder coating compositions comprising epoxide functional polymer and carboxylic acid functional crosslinking agent are typically cured at a temperature of from 121° C. to 177° C. over a period of from 10 to 60 minutes.

Curable powder coating compositions comprising carboxylic acid functional polymer and beta-hydroxyalkylamide functional crosslinking agent are also useful in the practice of the method of the present invention. Classes of useful carboxylic acid functional polymers include, but are not limited to, carboxylic acid functional vinyl polymers, carboxylic acid functional polyesters, carboxylic acid functional polyurethanes and mixtures thereof.

Carboxylic acid functional vinyl polymers can be prepared by free radical polymerization methods that are known to those of ordinary skill in the art, for example, free radical polymerization methods as described previously herein. The carboxylic acid functional vinyl polymer is typically prepared by polymerizing one or more carboxylic acid functional ethylenically unsaturated monomers, e.g., (meth) acrylic acid, with one or more ethylenically unsaturated monomers that are free of carboxylic acid functionality, e.g., methyl (meth)acrylate, isobornyl (meth)acrylate, butyl (meth)acrylate and styrene. Alternatively, the carboxylic acid functional vinyl polymer may be prepared by first preparing a hydroxy functional vinyl polymer that is then reacted with a cyclic anhydride, e.g., succinic anhydride. Carboxylic acid functional vinyl, e.g., (meth)acrylic, polymers useful in the present invention are described in U.S. Pat. No. 4,937,288, column 2, line 1 through column 4, line 17, the disclosure of which is incorporated herein by reference.

Polyesters having carboxylic acid functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has carboxylic acid functionality and the desired molecular weight. Carboxylic acid functional polyesters useful in the present invention are described in, for example, U.S. Pat. No. 4,937,288, column 4, line 18 through column 6, line 12, which disclosure is incorporated herein by reference.

Carboxylic acid functional polyurethanes may be prepared by reacting polyols and polyisocyanates so as to form a polyurethane polyol, which is then reacted with polycarboxylic acid or cyclic anhydride to introduce free carboxylic acid groups into the reaction product. Carboxylic acid functional polyurethanes that may be used in curable powder coating compositions comprising beta-hydroxyalkylamide crosslinking agent are described in further detail in U.S. Pat. No. 4,937,288, at column 6, lines 13 through 39, which disclosure is incorporated herein by reference.

One or more beta-hydroxyalkylamide crosslinking agents may be present in the curable powder coating compositions comprising carboxylic acid functional polymer. The beta-hydroxyalkylamide crosslinking agent can be represented by the following general formula II:

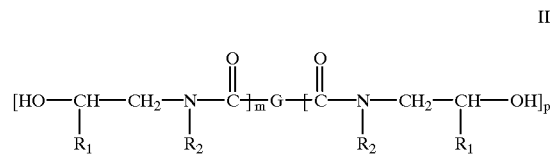

wherein $R_1$ is H or $C_1$–$C_5$ alkyl; $R_2$ is H, $C_1$–$C_5$ alkyl or

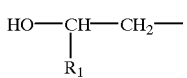

for which $R_1$ is as described above, G is a chemical bond or monovalent or polyvalent organic radical derived from saturated, unsaturated or aromatic hydrocarbon radicals including substituted hydrocarbon radicals containing from 2 to 20 carbon atoms, m equals 1 or 2, p equals 0 to 2, and m+p is at least 2. Preferably, G is an alkylene radical —$(CH_2)_x$— where x is equal to 2 to 12, preferably 4 to 10; m is equal to 1 to 2, p is equal to 0 to 2, and m+p is at least 2, preferably greater than 2, usually within the range from greater than 2 up to and including 4.

The beta-hydroxyalkylamide crosslinking agent represented by general formula II can be prepared by art recognized methods, as described in U.S. Pat. No. 4,937,288 at column 7, lines 6 through 16, which disclosure is incorporated herein by reference.

Curable powder coating compositions comprising carboxylic acid functional polymer and beta-hydroxyalkylamide crosslinking agent typically have present therein carboxylic acid functional polymer in an amount of from 60 percent to 95 percent by weight, based on total resin solids weight of the composition, e.g., from 80 percent to 90 percent by weight, based on total resin solids weight of the composition. The beta-hydroxyakylamide crosslinking agent is typically present in the curable powder coating composition in an amount corresponding to the balance of these recited ranges, i.e., 5 to 40, particularly 10 to 20, percent by weight.

To achieve a suitable level of cure, the equivalent ratio of hydroxy equivalents in the beta-hydroxyalkylamide crosslinking agent to carboxylic acid equivalents in the carboxylic acid functional polymer is preferably from 0.6:1 to 1.6:1, and more preferably from 0.8:1 to 1.3:1. Ratios outside the range of 0.6:1 to 1.6:1 are generally undesirable due to the resulting poor cure response associated therewith. Curable powder coating compositions comprising carboxylic acid functional polymer and beta-hydroxyalkylamide functional crosslinking agent are typically cured at a temperature of from 149° C. to 204° C. over a period of from 10 to 60 minutes.

Also useful in the method of the present invention are curable powder coating compositions comprising hydroxy functional polymer and capped isocyanate functional crosslinking agent. Hydroxy functional polymers that can be used in such compositions include, but are not limited to, hydroxy functional vinyl polymers, hydroxy functional polyesters, hydroxy functional polyurethanes and mixtures thereof.

Vinyl polymers having hydroxy functionality can be prepared by free radical polymerization methods that are known to those of ordinary skill in the art, for example as described in U.S. Pat. No. 5,508,337, column 3, line 15 through column 5, line 23, which disclosure is incorporated herein by reference. In an embodiment of the present invention, the hydroxy functional vinyl polymer is prepared from a majority of (meth)acrylate monomers and is referred to herein as a "hydroxy functional (meth)acrylic polymer."

Hydroxy functional polyesters useful in curable powder coating compositions comprising capped isocyanate functional crosslinking agent can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium. Hydroxy functional polyesters useful in the present invention are described in U.S. Pat. No. 5,508,337 at column 5, line 24 through column 6, line 30, the disclosure of which is incorporated herein by reference.

Hydroxy functional urethanes can be prepared by art-recognized methods, for example, as previously described herein. Hydroxy functional urethanes useful in the present invention are described in further detail in U.S. Pat. No. 5,510,444, at column 5, line 33 through column 7, line 61, the disclosure of which is incorporated herein by reference.

By "capped isocyanate crosslinking agent" is meant a crosslinking agent having two or more capped isocyanate groups that can decap (or deblock) under cure conditions, e.g., at elevated temperature, to form free isocyanate groups and free capping groups. The free isocyanate groups formed by decapping of the crosslinking agent are preferably capable of reacting and forming substantially permanent covalent bonds with the hydroxy groups of hydroxy functional polymer.

It is desirable that the capping group of the capped isocyanate crosslinking agent not adversely affect the curable powder coating composition upon decapping from the isocyanate, i.e., when it becomes a free capping group. For example, it is desirable that the free capping group neither become trapped in the cured film as gas bubbles nor excessively plasticize the cured film. Capping groups useful in the present invention preferably have the characteristics of being nonfugitive or capable of escaping substantially from the forming coating prior to its vitrification.

Classes of capping groups of the capped isocyanate crosslinking agent may be selected from: hydroxy functional compounds, e.g., ethylene glycol butyl ether, phenol and p-hydroxy methylbenzoate; 1H-azoles, e.g., 1H-1,2,4-triazole and 1H-2,5-dimethyl pyrazole; lactams, e.g., e-caprolactam and 2-pyrolidinone; ketoximes, e.g., 2-propanone oxime and 2-butanone oxime and those ketoximes described in U.S. Pat. No. 5,508,337 at column 7, lines 11 through 22, the disclosure of which is incorporated herein by reference. Other suitable capping groups include, morpholine, 3-aminopropyl morpholine and N-hydroxy phthalimide.

The isocyanate or mixture of isocyanates of the capped isocyanate crosslinking agent has two or more isocyanate groups and is preferably solid at room temperature. Examples of suitable isocyanates that may be used to prepare the capped isocyanate crosslinking agent include, monomeric diisocyanates, e.g., α,α'-xylylene diisocyanate, α,α,α',α'-tetramethylxylylene diisocyanate and 1-isocyanato-3-isocyanatomethyl-3,5,5-trimethylcyclohexane (isophorone diisocyanate or IPDI), and dimers and trimers of monomeric diisocyanates containing isocyanurate, uretidino, biruet or allophanate linkages, e.g., the trimer of IPDI. Isocyanates that are useful in the present invention are described in further detail in U.S. Pat. No. 5,777,061 at column 3, line 4 through column 4, line 40, the disclosure of which is incorporated herein by reference. A particularly preferred isocyanate is a trimer of 1-isocyanato-3,3,5-trimethyl-5-isocyanatomethylcyclohexane.

The capped isocyanate crosslinking agent may also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, e.g., trimethylolpropane (TMP), and an isocyanate monomer, e.g., 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared ("TMP-3IPDI"). The three free isocyanate groups per TMP-3IPDI adduct are then capped with a capping group, e.g., 2-propanone oxime or e-caprolactam.

To catalyze the reaction between the isocyanate groups of the capped polyisocyanate crosslinking agent and the hydroxy groups of the hydroxy functional polymer, one or more catalysts are typically present in the powder coating composition in amounts of from, for example, 0.1 to 5 percent by weight, based on total resin solids of the composition. Classes of useful catalysts include, metal compounds, in particular, organic tin compounds, e.g., tin (II) octanoate and dibutyltin(IV) dilaurate, and tertiary amines, e.g., diazabicyclo[2.2.2]octane. Examples of organic tin compounds and tertiary amines are described in U.S. Pat. No. 5,508,337 at column 7, lines 28 through 49, the disclosure of which is incorporated herein by reference.

Curable powder coating compositions comprising hydroxy functional polymer and capped isocyanate functional crosslinking agent, typically have present therein hydroxy functional polymer in an amount of from 55 percent to 95 percent by weight, based on total resin solids weight of the composition, e.g., from 75 percent to 90 percent by weight, based on total resin solids weight of the composition. The capped isocyanate functional crosslinking agent is typically present in the powder composition in an amount corresponding to the balance of these recited ranges, i.e., 5 to 45, particularly 10 to 25, percent by weight.

The equivalent ratio of isocyanate equivalents in the capped isocyanate crosslinking agent to hydroxy equivalents in the hydroxy functional polymer is typically within the range of 1:3 to 3:1, e.g., 1:2 to 2:1. While equivalent ratios outside of this range can be employed, they are generally less desirable due to performance deficiencies in cured films obtained therefrom. Powder coating compositions comprising hydroxy functional polymer and capped isocyanate functional crosslinking agent are typically cured at a temperature of from 120° C. to 190° C. over a period of from 10 to 60 minutes.

Curable powder coating compositions may optionally contain additives such as waxes for flow and wetting, flow control agents, e.g., poly(2-ethylhexyl)acrylate, degassing additives such as benzoin, adjuvant resin to modify and optimize coating properties, antioxidants and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight, based on total weight of resin solids of the curable composition.

Curable powder coating compositions useful in the method of the present invention are typically prepared by first dry blending the functional polymer, e.g., epoxide functional polymer, the crosslinking agent and additives, such as flow control agents, degassing agents and catalysts, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range sufficient to melt but not gel the components. For example, when preparing curable powder coating compositions comprising epoxide functional (meth)acrylic polymer and carboxylic acid functional crosslinking agent, the extruder is typically operated within a temperature range of from 80° C. to 140° C., e.g., from 100° C. to 125° C.

Optionally, curable powder coating compositions of the present invention may be melt blended in two or more steps. For example, a first melt blend is prepared in the absence of cure catalyst and photochromic material. A second melt blend is prepared at a lower temperature, from a dry blend of the first melt blend and the cure catalyst and optionally photochromic material. The melt blended curable powder coating composition is typically milled to an average particle size of from, for example, 15 to 30 microns.

Polymerizable organic casting compositions that may be used in the method of the present invention include those that are known in the art and from which shaped articles may be prepared. In a preferred embodiment of the present invention, the polymerizable organic casting composition is a polymerizable organic optical resin composition which can be used to prepare molded optical articles, such as lenses. The polymerizable organic optical resin composition may be selected from compositions comprising monomers having radically polymerizable ethylenically unsaturated groups selected from the group consisting of (meth)acryloyl, vinyl, allyl and combinations thereof, and compositions comprising reactants having active hydrogen groups and coreactants having iso(thio)cyanate groups.

In a preferred embodiment of the present invention the polymerizable organic optical resin composition comprises a radically polymerizable monomer represented by the following general formula III, $$R_3\text{---}[\text{---}O\text{---}C(O)\text{---}O\text{---}R_4]_i \qquad \text{III}$$

wherein $R_3$ is a radical derived from a polyol, e.g., a glycol, having two or more hydroxy groups, $R_4$ is a radical derived from an allyl or substituted allyl group and i is a whole number from 2 to 4, preferably 2. The radically polymerizable monomer represented by general formula III may be further described as a polyol(allyl carbonate) monomer. Polyol(allyl carbonate) monomers that may be used in the aforedescribed polymerizable organic composition are allyl carbonates of, for example, linear or branched aliphatic polyols, e.g., aliphatic glycol bis(allyl carbonate) compounds, cycloaliphatic polyols, and aromatic polyols, e.g., 4,4'-isopropylidenediphenol bis(allyl carbonate). The polyol(allyl carbonate) monomer may be prepared by procedures well known in the art, e.g., as described in U.S. Pat. Nos. 2,370,567 and 2,403,113.

In reference to general formula III, $R_4$ is a radical derived from an allyl group which may be substituted at the 2-position with a halogen, most notably chlorine or bromine, or an alkyl group containing from 1 to 4, e.g., 1 to 2, carbon atoms. Generally, the alkyl substituent is methyl or ethyl. The $R_4$ radical may be represented by the following general formula IV:

$$H_2C\text{=}C(R_5)\text{---}CH_2\text{---} \qquad \text{IV}$$

wherein $R_5$ is hydrogen, halogen or a $C_1$ to $C_4$ alkyl group. Most commonly, $R_5$ is hydrogen and consequently $R_1$ is the unsubstituted allyl group, $$H_2C\text{=}CH\text{---}CH_2\text{---}.$$

With reference to general formula III, $R_3$ is a polyvalent radical derived from a polyol, which can, for example, be an aliphatic or cycloaliphatic polyol, containing 2, 3, 4, 5 or 6 hydroxy groups. Typically, the polyol contains 2 hydroxy groups, i.e., a glycol. When the polyol is an aliphatic polyol, it may be linear or branched and contain from 2 to 10 carbon atoms. Commonly, the aliphatic polyol is an alkylene glycol having from 2 to 4 carbons atoms, e.g., ethylene glycol, propylene glycol, trimethylene glycol, tetramethylene glycol, or a poly($C_2$–$C_4$) alkylene glycol, e.g., diethylene glycol, triethylene glycol, etc.

Specific examples of polyol(allyl carbonate) monomers include, but are not limited to, ethylene glycol bis(2-chloroallyl carbonate), ethylene glycol bis(allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4 butanediol bis(2-bromoallyl carbonate), dipropylene glycol bis(allyl carbonate), trimethylene glycol bis(2-ethylallyl carbonate), pentamethylene glycol bis(allyl carbonate), 1,4-cyclohexanediol bis(allyl carbonate) and 4,4'-isopropylidenebiscyclohexanol bis(allyl carbonate). The preferred polyol(allyl carbonate) monomer is diethylene glycol bis(allyl carbonate).

A detailed description of polyol(allyl carbonate) monomers that may be used in the polymerizable organic resin compositions of the method of the present invention is found in U.S. Pat. No. 4,637,698 at column 3, line 33 through column 5, line 61. That disclosure is hereby incorporated by reference and is summarized above.

As used in the present description with reference to the radically polymerizable monomer represented by general formula III, the term polyol(allyl carbonate) monomer or like names, e.g., diethylene glycol bis(allyl carbonate), is intended to mean and include the named monomers or prepolymers thereof and any related monomer or oligomer species contained therein.

Classes of radically polymerizable ethylenically unsaturated monomers having (meth)acryloyl groups that may be used in the polymerizable organic optical resin compositions of the method of the present invention, include those that are known in the art, for example: (meth)acryloyl functional polyethers, e.g., poly(ethylene glycol)dimethacrylate, alkoxylated 4,4'-isopropylidenediphenol di(meth)acrylates, alkoxylated trimethylolpropane tri(meth)acrylates and alkoxylated pentaerythritol tri- and tetra(meth)acrylates; and (meth)acryloyl functional polyols, e.g., ethylene glycol di(meth)acrylate, 4,4'-isopropylidenediphenol di(meth) acrylate, trimethylolpropane tri(meth)acrylate and pentaerythritol tri- and tetra (meth)acrylate. Polymerizable organic optical resin compositions useful in the method of the present invention may also comprise monomers having a single radically polymerizable ethylenically unsaturated group, examples of which include, (meth)acrylic acid, esters of (meth)acrylic acid, such as methyl (meth)acrylate, 2-hydroxyethyl (meth)acrylate, methyl (meth)acrylate, phenoxyethyl (meth)acrylate, isobornyl (meth)acrylate, cyclohexyl (meth)acrylate and 2-hydroxyethyl (meth)acrylate, vinyl esters such as vinyl acetate, and styrene.

Examples of polymerizable ethylenically unsaturated monomers having vinyl groups include, but are not limited to: 1,2-, 1,3- and 1,4-divinyl benzene and mixtures of structural isomers of divinyl benzene; diisopropenyl benzene, e.g., 1,2-, 1,3- and 1,4-diisopropenyl benzene and mixtures of structural isomers of diisopropenyl benzene; trivinyl benzene, e.g., 1,3,5-triethenyl benzene; divinyl naphthalene, e.g., 2,6-diethenyl naphthalene; and halogen substituted derivatives of divinyl benzene, diisopropenyl benzene, trivinyl benzene and divinyl naphthalene, e.g., 2-chloro-1,4-diethyenyl benzene.

Polymerizable organic optical resin compositions comprising monomers having radically polymerizable ethylenically unsaturated groups, may also further comprise monomers having two or more thiol (or mercapto) groups. Not intending to be bound by any theory, it is thought that covalent bonds are formed between the thiol groups and ethylenically unsaturated groups of the monomers in such compositions by means of a thiol-ene reaction mechanism, as it is known to those of ordinary skill in the art. Examples of polythiol monomers suitable for use in the polymerizable organic optical resin compositions include, but are not limited to, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), polyethylene glycol di(2-mercaptoacetate), polyethylene glycol di(3-mercaptopropionate) and mixtures thereof.

Polymerization of polymerizable organic optical resin compositions comprising monomers having radically polymerizable ethylenically unsaturated groups may be accomplished by the art-recognized method of adding to the composition an initiating amount of material capable of generating free radicals, such as organic peroxy compounds or azobis(organonitrile) compounds, i.e., an initiator. Methods for polymerizing free radical polymerizable compositions are well known to the skilled artisan and any of those well known techniques may be used to polymerize the aforedescribed polymerizable organic optical resin compositions. Such polymerization methods include thermal polymerization, photopolymerization or a combination thereof.

Examples of suitable organic peroxy compounds, that may be used as thermal polymerization initiators include, tertiarybutylperoxy isopropyl carbonate, diisopropylperoxydicarbonate, benzoyl peroxide and t-butylperoxy pivalate. Organic peroxy compounds are described in further detail in U.S. Pat. No. 5,811,508 at column 7, line 61 through column 8, line 9, which disclosure is incorporated herein by reference. Preferred thermal initiators are those that do not discolor the resulting polymerizate.

Examples of suitable azobis(organonitrile) compounds, that may be used as thermal polymerization initiators include: azobis(isobutyronitrile) and azobis(2,4-dimethylvaleronitrile). When the casting composition comprises monomers represented by general formula III, the preferred thermal initiator is diisopropylperoxydicarbonate. Typically, the thermal cure cycle involves heating the polymerizable organic casting composition, in the presence of initiator, from room temperature to a maximum temperature of from 85° C. to 125° C. in stages over a period of from 2 to 30 hours.

Photopolymerization of radically polymerizable organic optical resin compositions may be carried out in the presence of a photopolymerization initiator using ultraviolet light, visible light, or a combination thereof. Examples of suitable photopolymerization initiators include benzoin, benzoin methyl ether, benzoin isobutyl ether benzophenol, acetophenone, 4,4'-dichlorobenzophenone, diethoxyacetophenone, 2-hydroxy-2methyl-1-phenylpropan-1-one, 1-hydroxycyclohexyl phenyl ketone, 2-isopropylthixanthone and 2,4,6-trimethylbenzoyldiphenylphosphine oxide.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically.

The amount of thermal and/or photopolymerization initiator used to initiate and polymerize radically polymerizable organic casting compositions is variable and will depend on the particular initiator used. Only that amount that is required to initiate and sustain the polymerization reaction is required, i.e., an initiating amount, for example, from 0.01% to 2% by weight, based on the weight of monomer components.

Various conventional additives may also be incorporated into the polymerizable organic casting composition. Such additives may include light stabilizers, heat stabilizers, antioxidants, static (non-photochromic) dyes, pigments, polymerization inhibitors to promote stability during storage, and ultraviolet light absorbers. Anti-yellowing additives, e.g., 3-methyl-2-butenol, organo pyrocarbonates and triphenyl phosphite [CAS 101-02-0], may also be added to polymerizable organic optical resin compositions to enhance resistance to yellowing.

It is also contemplated that a polymerization moderator, or mixtures of polymerization moderators, may be added to the polymerizable organic casting composition (in amounts typically from 0.3% to 5% by weight, based on total weight of the composition) to minimize the formation of distortions, such as striations, in polymerizates obtained therefrom. Suitable polymerization moderators include for example, alpha-methyl styrene. Additional polymerization moderators are described in U.S. Pat. No. 5,811,503 at column 9, lines 47 through 64, the disclosure of which is incorporated herein by reference.

The polymerizable organic optical resin composition may comprise reactants having active hydrogen groups, e.g., hydroxyl and/or thiol groups, and coreactants having iso (thio)cyanate groups. As used herein, by "iso(thio)cyanate groups" is meant to refer to both "isocyanate groups," i.e., —NCO, and "isothiocyanate groups," i.e., —NCS, which are free of blocking or capping groups, and are capable of forming covalent bonds with reactive hydrogen groups, e.g., thiol or hydroxy groups. Such casting compositions are known in the art and are commonly referred to as two-component or two-pack casting compositions.

Examples of reactants having active hydrogen groups, such as polyols and polythiols, and coreactants having isocyanate groups include those previously recited herein. Examples of coreactants having isothiocyanate groups, e.g., p-phenylenediisopropylidene diisothiocyanate, cyclohexane diisothiocyanate and 1,6-diisothiocyanatohexane, and additional examples of polyols, polythiols and polyisocyanates include, but are not limited to, those listed in U.S. Pat. Nos. 5,594,088 and 5,693,738 the disclosures of which are incorporated herein in their entirety.

The curable photochromic powder coating compositions that are used in the method of the present invention comprise one or more photochromic materials. Preferably, the photochromic material is selected from an organic photochromic material comprising at least one of spiro(indoline) naphthoxazines, spiro(indoline)benzoxazines, benzopyrans, naphthopyrans, organo-metal dithizonates, fulgides and fulgimides, each of which are described in further detail herein.

A first group of organic photochromic materials contemplated for use in the curable powder coatings compositions of the method of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such materials that are useful in the present invention include, but are not limited to, spiro(indoline) naphthoxazines and spiro(indoline)benzoxazines. These and other classes of such photochromic materials are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic materials contemplated for use in the curable powder coatings compositions of the method of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such materials include certain benzopyrans and naphthopyrans, both of which are commonly and collectively referred to as chromenes. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic materials contemplated for use in the curable powder coating compositions of the method of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these materials include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic materials contemplated for use in the curable powder coating compositions of the method of the present invention include photochromic organo-metal dithizonates, i.e., (arylazo)-thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic materials in the aforedescribed patents are incorporated herein, in toto, by reference. The curable photochromic powder coating compositions used in the present invention may contain one photochromic material or a mixture of photochromic materials, as desired. Mixtures of photochromic materials may be used to attain certain activated colors such as a near neutral gray or brown.

Curable photochromic powder coating compositions may comprise any of the photochromic substances described herein in amounts and in ratios (when mixtures are used) such that a shaped article prepared in accordance with the method of the present invention exhibits a desired resultant color, e.g., a substantially neutral color such as shades of gray or brown when activated with unfiltered sunlight, i.e., as near a neutral color as possible given the colors of the activated photochromic materials. The relative amounts of the aforesaid photochromic materials used will vary and depend in part upon the relative intensities of the color of the activated species of such compounds, and the ultimate color desired.

The amount of photochromic material present in the curable photochromic powder coating composition is not critical provided that a sufficient amount is used to produce a photochromic effect discernible to the naked eye upon activation. As used herein and in the claims, such amount is referred to as "a photochromic amount." The particular amount used depends often upon the intensity of color desired upon irradiation thereof and the thickness of the curable photochromic powder coating composition applied to the interior surface of the mold. Typically, the more photochromic material present, the greater is the color intensity. Generally, the amount of photochromic material(s) present in the curable photochromic powder coating composition may range from 0.1 percent to 20 percent by weight, based on the total weight of the powder coating composition, e.g., from 0.5 or 1 percent to 10 percent by weight, based on the total weight of the powder coating composition.

FIG. 1 of the drawings represents a cross-sectional view of a lens having a photochromic coating thereon prepared in accordance with an embodiment of the present invention. The molded lens 4 of FIG. 1 comprises a lens substrate 10 having an in-mold applied photochromic powder coating layer 12 thereon. Lens substrate 10 has a concave surface 11 that is free of in-mold applied powder coating. Photochromic powder coating layer 12 has an exposed surface 16, which defines the optically smooth convex surface of molded lens 4.

Figure 2:
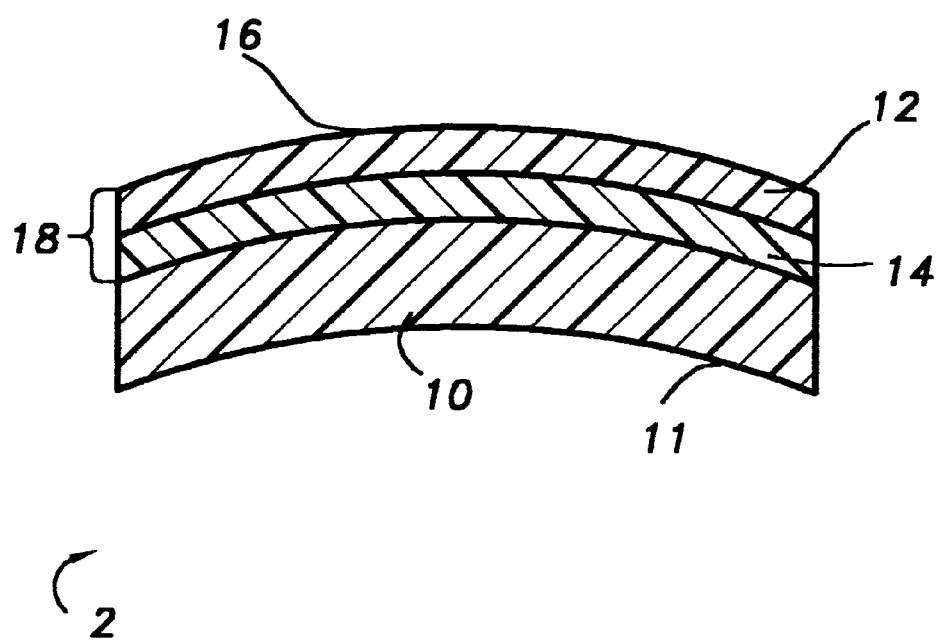
FIGS. 2–4 represent cross-sectional views of lenses having a plurality of layered coatings thereon prepared according to the method of the present invention.
Figure 3:
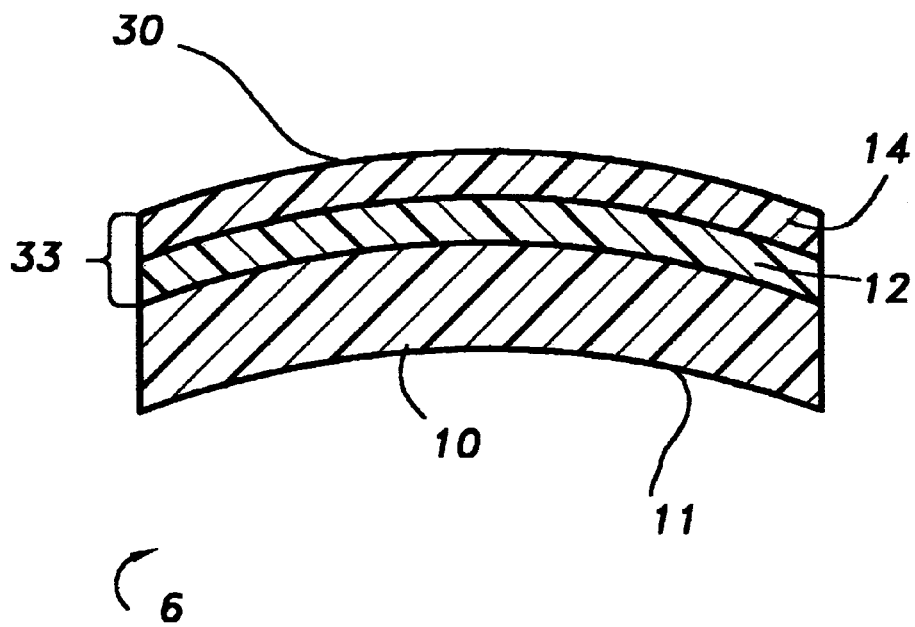
Figure 4:
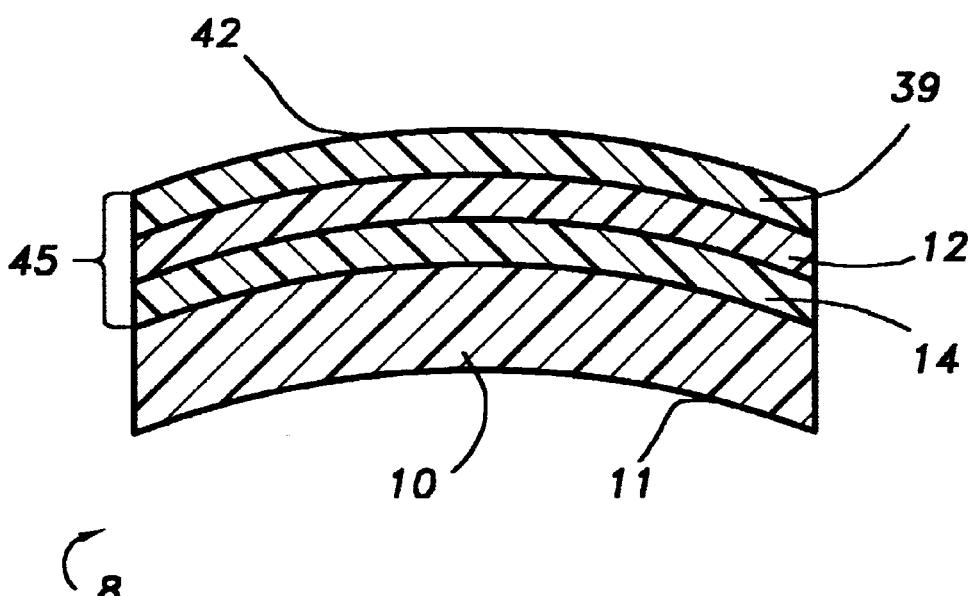

The molded lenses 2, 6 and 8 of FIGS. 2–4 represent cross-sectional views of photochromic lenses having a plurality of coatings thereon prepared in accordance with further embodiments of the present invention. The plurality of coatings shown in FIGS. 2–4 are more particularly described as multi-layered composite coatings. The molded lens of FIG. 2 comprises lens substrate 10 having an in-mold applied multi-layered composite coating 18 thereon. Multi-layered composite coating 18 is composed of photochromic powder coating layer 12 and optically clear powder coating layer 14 (that is substantially free of photochromic material), which is interposed between lens substrate 10 and photochromic powder coating layer 12.

The molded lens 6 of FIG. 3 comprises lens substrate 10 having an in-mold applied multi-layered composite coating 33 thereon. Multi-layered composite photochromic coating 33 is composed of optically clear powder coating layer 14 (that is substantially free of photochromic material) and photochromic powder coating layer 12, which is interposed between lens substrate 10 and optically clear powder coating layer 14. Optically clear powder coating layer 14 has a surface 30, which defines the optically smooth convex surface of molded lens 6.

In FIG. 4, molded lens 8 comprises lens substrate 10 having an in-mold applied multi-layered composite powder coating 45 thereon. Multi-layered composite coating 45 is composed of photochromic powder coating layer 12, which is interposed between optically clear powder coating layers 39 and 14. Optically clear powder coating layer 14 is interposed between photochromic powder coating layer 12 and lens substrate 10. Optically clear powder coating layer 39 has an exposed surface 42, which defines the optically smooth convex surface of molded lens 8. Optically clear powder coating layers 39 and 14 are both substantially free of photochromic material and may have the same or different compositions.

The present invention is more particularly described in the following examples, which are intended to be illustrative only, since numerous modifications and variations therein will be apparent to those skilled in the art. Unless otherwise specified, all parts and percentages are by weight.

EXAMPLE 1

Preparation of Powder Coating Compositions

The following summarizes two thermosetting powder coating compositions used in the method of the present invention. Composition A is an optically clear powder coating composition (that is substantially free of photochromic material) used in combination with the photochromic powder coating composition of Composition B to prepare shaped articles having photochromic coatings thereon.

| | Powder Coating Composition | |
|---|---|---|
| | A | B |
| Ingredients | Parts by weight | |
| Epoxide functional acrylic polymer[b] | 1000 | 1000 |
| dodecanedioic acid | 254 | 254 |
| Photochromic naphthopyran[c] | 0 | 8 |
| UV light stabilizer[d] | 0 | 23 |
| Anti-yellowing additive[e] | 25.2 | 25.2 |
| Flow additive[f] | 10 | 10 |
| Benzoin | 10 | 10 |
| Silica[g] | 5 | 5 |
| Methyl Dicocoamine | 12 | 12 |

[b]The epoxide functional acrylic polymer was obtained from material produced by a process based on the laboratory scale process described previously herein under the heading of "Epoxide Functional Acrylic Polymer," and had similar physical properties.

The optically clear powder coating composition of Powder Coating Composition A was prepared using a double extrusion process. The ingredients, exclusive of the methyl dicocoamine catalyst, were mixed together in a high speed rotary blade blender until a homogeneous first dry-blend was obtained. The homogenous first dry-blend was melt mixed in a twin-screw co-rotating extruder operated at a temperature of from 110° C. to 115° C. to form a molten first extrudate. This molten first extrudate was pressed into a thin sheet, cooled and solidified on a set of chilled rollers, and then broken into smaller chips. A homogeneous second dry-blend was prepared by mixing the solid first extrudate and the catalyst in appropriate proportions in a high speed rotary blade blender. The second dry-blend was extruded in a twin-screw co-rotating extruder operated at a temperature of from 87° C. to 93° C. to form a molten second extrudate. The molten second extrudate of Powder Coating Composition A was cooled and solidified on a set of chilled rollers, broken into smaller chips, milled and classified to form a thermosetting optically clear powder composition having an average particle size of from 20 to 25 microns.

The photochromic powder coating composition of Powder Coating Composition B was prepared in a manner similar to that of Powder Coating Composition A, using a double extrusion process. However, the photochromic naphthopyran material and the UV light stabilizer were separately melt mixed in a weight ratio of 0.35:1.00 respectively using a stainless steel spatula in a shallow glass beaker on a 177° C. hot plate. When the naphthopyran and the UV light stabilizer were observed to form a homogenous melt mixture, the mixture was removed from the hot plate and allowed to cool to room temperature and harden. The photochromic naphthopyran material/UV light stabilizer premixture and the methyl dicocoamine catalyst were both introduced into Powder Coating composition B during the second extrusion. The photochromic powder coating composition of Composition B had an average particle size of from 20 to 25 microns.

EXAMPLE 2

A cast sheet having a multi-layered photochromic coating on one side was prepared in accordance with the present invention as follows. A two part glass mold having interior dimensions of 15.24 cm×15.24 cm×0.64 cm was used. One half of the glass mold was preheated in an electric oven set at 135° C. for 10 minutes. The thermosetting photochromic powder composition of Composition B was applied, using a hand held electrostatic powder gun, to the interior of the preheated half of the mold within a minute of its removal from the oven. Immediately upon completing this powder application, and while the glass mold half was still warm, the thermosetting optically clear powder composition of Composition A was applied similarly over the applied photochromic powder coating layer. The coated mold half was then placed in an electric oven at 135° C. for 30 minutes, and the two powder coating layers were co-cured.

Upon removal from the oven and cooling to room temperature, the coated and uncoated halves of the glass mold were assembled. Into the assembled mold was injected a polymerizable organic optical resin composition composed of a homogenous mixture of 100 parts CR-39® diethylene glycol bis(allyl carbonate) monomer available from PPG Industries, Inc., and 3 parts diisopropylperoxydicarbonate. The filled mold was then placed in an electric oven and its contents polymerized using the cure cycle described in Table 1. Upon completion of the cure cycle a cast sheet having a multi-layered photochromic coating on one side was removed from the disassembled mold.

TABLE 1[h]

| Cast Sheet Cure Cycle | |
|---|---|
| Temperature | Time (Hours) |
| 44° C. to 58° C. | 10.1 |
| 58° C. to 64° C. | 1.9 |
| 64° C. to 70° C. | 2.5 |
| 70° C. to 77° C. | 0.7 |
| 77° C. to 85° C. | 1.0 |
| 85° C. to 90° C. | 0.3 |
| 90° C. to 104° C. | 0.5 |
| 104° C. Hold | 0.25 |
| 104° C. to 80° C. | 2.0 |
| 80° C. Hold | Until demolded. |

[h]The rate of temperature change represented in Table 1 was, in all instances, linear.

Based on analysis of similarly prepared cast sheets, the total thickness of the in-mold applied powder coating layers was determined to be between 300 and 400 microns, with each of the photochromic and clear powder coating layers being of about equivalent thickness. Mold release of the in-mold applied powder coatings was observed to be good. The cast sheet of Example 2 was observed to have a smoothness substantially similar to that of cast sheets having no coatings thereon. Shaped articles prepared according to the method of the present invention were observed to have photochromic properties.

The present invention has been described with reference to specific details of particular embodiments thereof. It is not intended that such details be regarded as limitations upon the scope of the invention except insofar as and to the extent that they are included in the accompanying claims.

What is claimed is:

1. A method of preparing a shaped article having a photochromic coating thereon comprising:
   (a) applying at least one curable powder coating composition to at least a portion of the interior of a mold having defined interior surfaces, wherein at least one of said applied powder coating compositions comprises a photochromic amount of photochromic material;
   (b) curing at least partially said applied powder coating composition;
   (c) charging a polymerizable organic casting composition into said mold;
   (d) polymerizing said polymerizable organic casting composition; and
   (e) removing from said mold a shaped article having a photochromic coating on at least a portion of a surface of said shaped article.

2. The method of claim 1 wherein said shaped article is a lens.

3. The method of claim 1 further comprising the step of preheating the interior of said mold prior to the application of said curable powder coating compositions in step (a), the preheated temperature of the interior being at least equal to the melting point but less than the cure temperature of said curable powder coating compositions.

4. The method of claim 1 wherein each of the curable powder coating compositions are independently selected from curable powder coating compositions comprising epoxide functional polymer and epoxide reactive crosslinking agent, curable powder coating compositions comprising carboxylic acid functional polymer and beta-hydroxyalkylamide functional crosslinking agent, and curable powder coating compositions comprising hydroxy functional polymer and capped isocyanate functional crosslinking agent.

5. The method of claim 4 wherein each of the curable powder coating compositions independently comprises epoxide functional vinyl polymer and epoxide reactive crosslinking agent.

6. The method of claim 1 wherein the photochromic material is selected from an organic photochromic material comprising at least one of spiro(indoline)naphthoxazines, spiro(indoline)benzoxazines, benzopyrans, naphthopyrans, organo-metal dithizonates, fulgides and fulgimides.

7. The method of claim 1 wherein said polymerizable organic casting composition is a polymerizable organic optical resin composition.

8. The method of claim 7 wherein said polymerizable organic optical resin composition is selected from compositions comprising monomers having radically polymerizable ethylenically unsaturated groups selected from the group consisting of (meth)acryloyl, vinyl, allyl and combinations thereof, and compositions comprising reactants having active hydrogen groups and coreactants having iso(thio)cyanate groups.

9. The method of claim 8 wherein the polymerizable organic casting composition is a polymerizable organic optical resin composition comprising a radically polymerizable monomer represented by the following general formula,

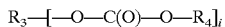

$$R_3 \text{---} [\text{---} O \text{---} C(O) \text{---} O \text{---} R_4]_i$$

wherein $R_3$ is a radical derived from a polyol having two or more hydroxy groups, $R_4$ is a radical derived from an allyl or substituted allyl group and i is a whole number from 2 to 4.

10. The method of claim 1 further comprising applying at least one additional curable powder coating composition to at least a portion of the interior of said mold other than that portion to which said curable powder coating compositions of step (a) are applied, said additional curable powder coating composition being selected from curable powder coating compositions comprising a photochromic amount of a photochromic material, curable optically clear powder coating compositions that are substantially free of photochromic material, and mixtures of said powder coating compositions.

11. The method of claim 1 wherein step (a) comprises:
   (i) applying a curable powder coating composition comprising a photochromic amount of photochromic material to at least a portion of the interior of said mold; and
   (ii) applying a curable optically clear powder coating composition that is substantially free of photochromic material over at least a portion of the applied curable powder coating composition comprising photochromic material.

12. The method of claim 1 wherein step (a) comprises:
   (i) applying a curable optically clear powder coating composition that is substantially free of photochromic material to at least a portion of the interior of said mold; and
   (ii) applying a curable powder coating composition comprising a photochromic amount of photochromic material over at least a portion of the applied curable optically clear powder coating composition.

13. The method of claim 1 wherein step (a) comprises:
   (i) applying a first curable optically clear powder coating composition that is substantially free of photochromic material to at least a portion of the interior of said mold;
   (ii) applying a curable powder coating composition comprising a photochromic amount of photochromic material over at least a portion of the applied first curable optically clear powder coating composition; and
   (iii) applying a second curable optically clear powder coating composition that is substantially free of photochromic material over at least a portion of the applied curable powder coating composition comprising photochromic material.

14. The method of claim 1 wherein step (a) comprises:
   (i) applying a first curable powder coating composition comprising a photochromic amount of photochromic material to at least a portion of the interior of said mold; and
   (ii) superposing a second curable powder coating composition on said first curable powder coating composition, said second curable powder coating composition comprising a photochromic amount of photochromic material that is different than the photochromic material of said first curable powder coating composition.

15. The method of claim 14 wherein step (a) further comprises superposing a curable optically clear powder coating composition that is substantially free of photochromic material on said second curable powder coating composition.

* * * * *

UNITED STATES PATENT AND TRADEMARK OFFICE
CERTIFICATE OF CORRECTION

PATENT NO. : 6,068,797
DATED : May 30, 2000
INVENTOR(S) : Robin L. Hunt

It is certified that error appears in the above-identified patent and that said Letters Patent is hereby corrected as shown below:

Column 22,
Line 26, the following lines should be added.

"c 3,3-diphenyl-3H-naphtho[2,1-b]pyran.

d TINUVIN-770 ultraviolet light stabilizer available from Ciba-Geigy, Corp., which describes it as bis(2,2,6,6-tetramethyl-4-piperidinyl) sebacate.

e GCA-1 anti-yellowing additive available from Sanko Chemical Corp.

f RESIFLOW L acrylic flow control additive, available from Estron Chemical, Inc.

g Cab-O-Sil® TS-610 treated fumed silica available from Cabot Corp."

Signed and Sealed this

Eleventh Day of September, 2001

Attest:

NICHOLAS P. GODICI
Attesting Officer  Acting Director of the United States Patent and Trademark Office